United States Patent [19]
Fukuda

[11] Patent Number: 5,347,795
[45] Date of Patent: Sep. 20, 1994

[54] TRANSVERSE SEALER FOR PACKAGING MACHINE

[75] Inventor: Masao Fukuda, Shiga, Japan

[73] Assignee: Ishida Scales Mfg. Co., Ltd., Kyoto, Japan

[21] Appl. No.: 983,561

[22] PCT Filed: Oct. 5, 1992

[86] PCT No.: PCT/JP92/01291
§ 371 Date: Feb. 5, 1993
§ 102(e) Date: Feb. 5, 1992

[87] PCT Pub. No.: WO93/07058
PCT Pub. Date: Apr. 15, 1993

[30] Foreign Application Priority Data

Oct. 3, 1991 [JP] Japan ................. 3-283526
Feb. 14, 1992 [JP] Japan ................. 4-061318
Apr. 3, 1992 [JP] Japan ................. 4-112242

[51] Int. Cl.⁵ .................... B65B 9/08; B65B 51/10
[52] U.S. Cl. .................................. 53/552; 53/373.7
[58] Field of Search ............. 53/373.7, 477, 479, 53/451, 450, 552, 551, 550, 77, 64

[56] References Cited

U.S. PATENT DOCUMENTS

| | | | |
|---|---|---|---|
| 4,199,919 | 4/1980 | Moscatelli | 53/552 |
| 4,750,313 | 6/1988 | Kammler et al. | 53/552 X |
| 4,909,016 | 3/1990 | Rentmeester | 53/552 |
| 5,016,426 | 5/1991 | Davis | 53/373.7 X |
| 5,063,727 | 11/1991 | Patelli | 53/552 |
| 5,203,145 | 4/1993 | Kammler et al. | 53/552 |

Primary Examiner—James F. Coan
Attorney, Agent, or Firm—Heller, Ehrman, White & McAuliffe

[57] ABSTRACT

A transverse sealer for a packaging machine has a pair of seal jaws for sealing a film after it is made into the shape of a bag by a former and the bag is filled with articles to be packaged. The pair of seal jaws are disposed on opposite sides of the path of the film and downstream to the former. A pair of rotary arms supporting these seal jaws is moved towards and away from each other such that the seal jaws move in straight trajectories along the path of the film and is so controlled that the compressive force between the seal jaws can be maintained at a specified level according to the thickness and material property of the film.

20 Claims, 12 Drawing Sheets

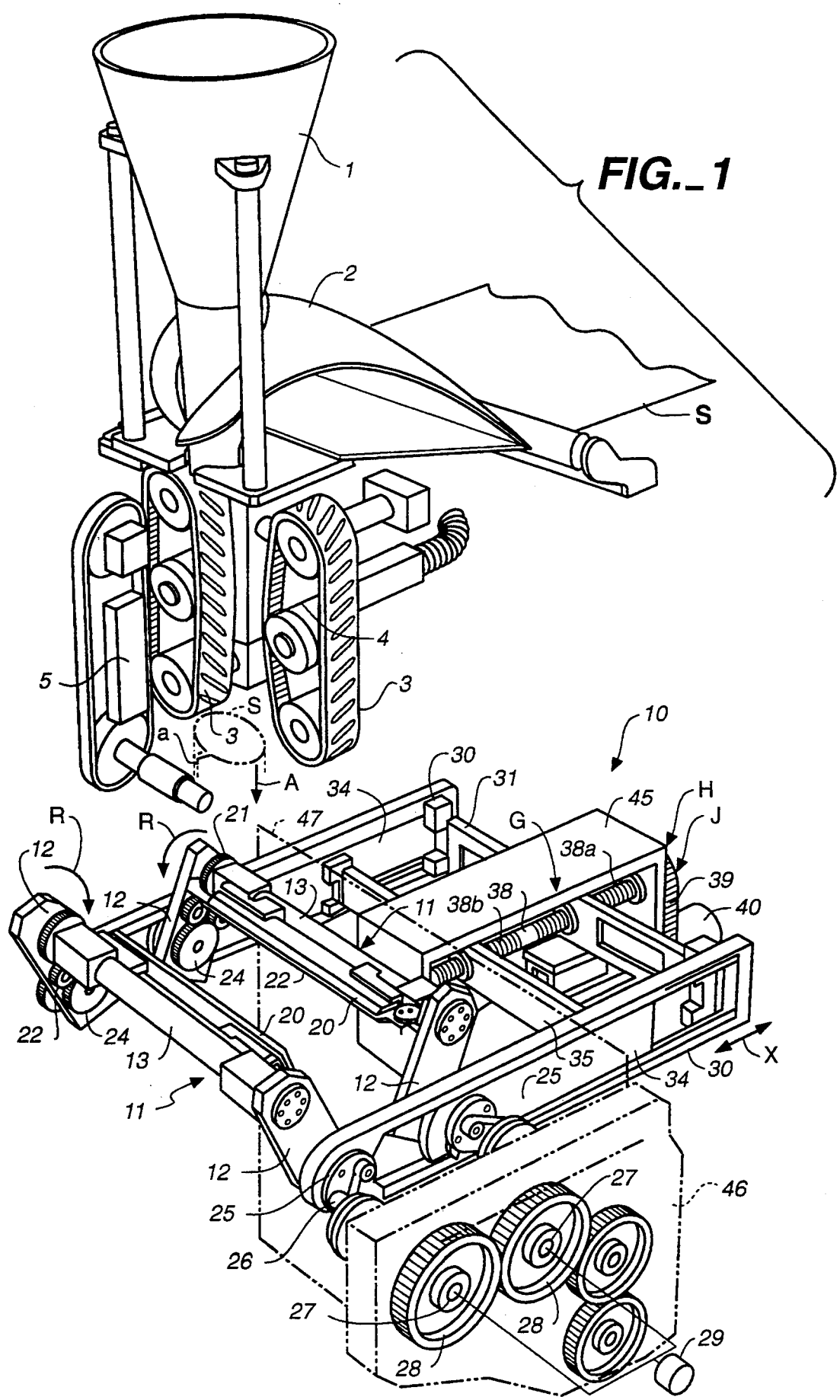
FIG._1

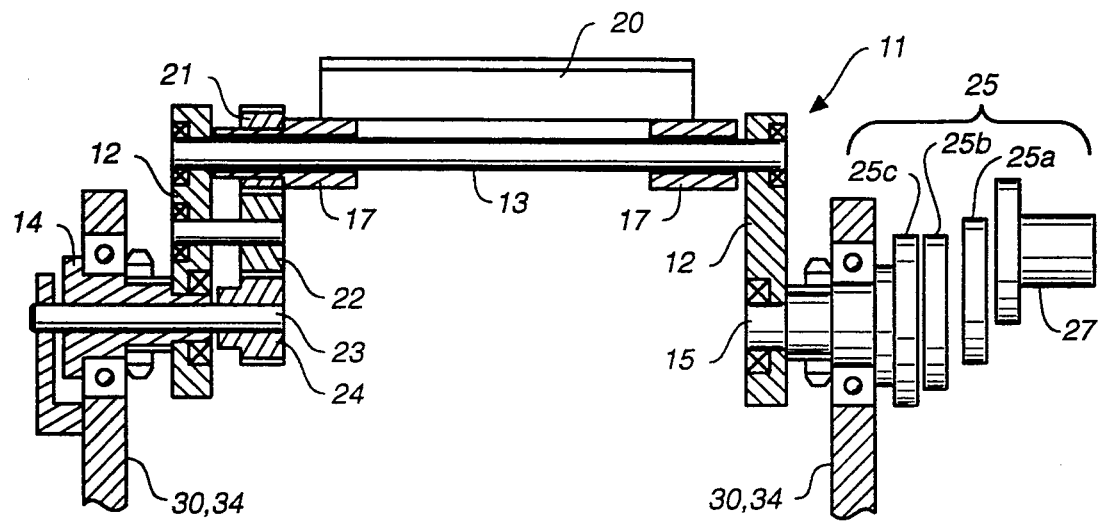
FIG._2
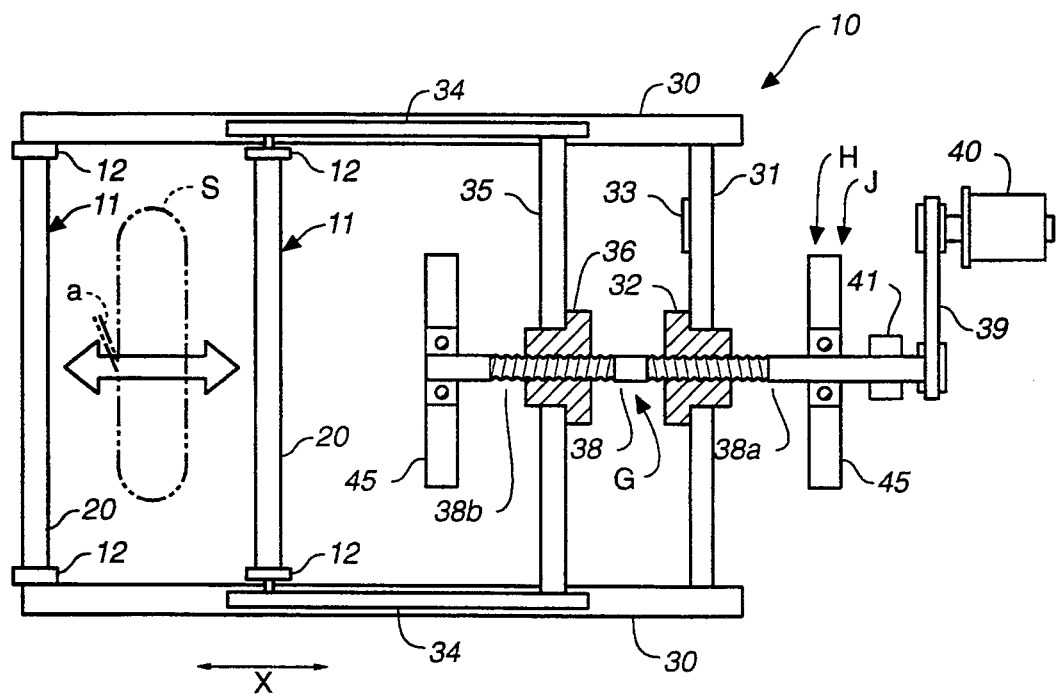
FIG._3

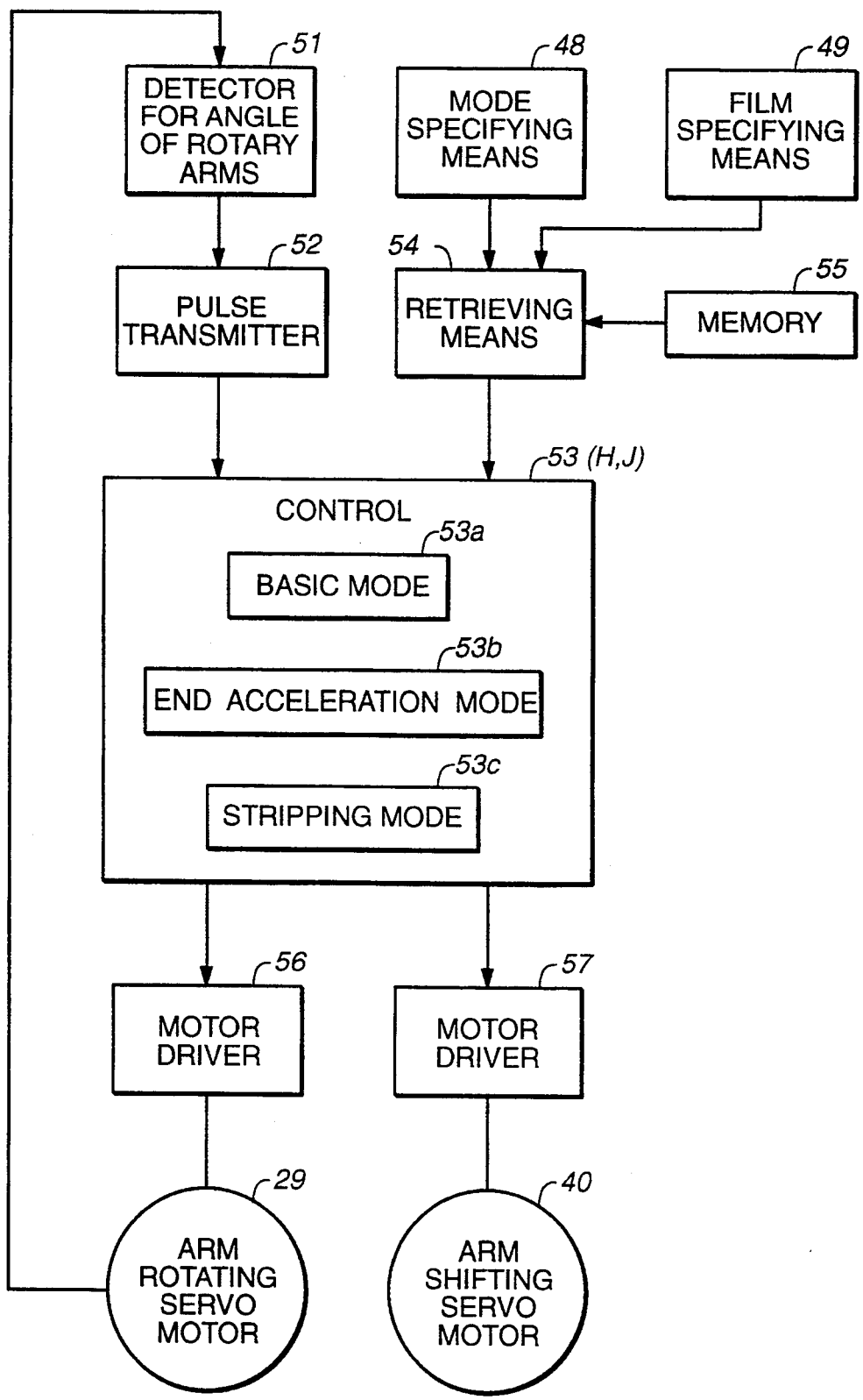
FIG._4

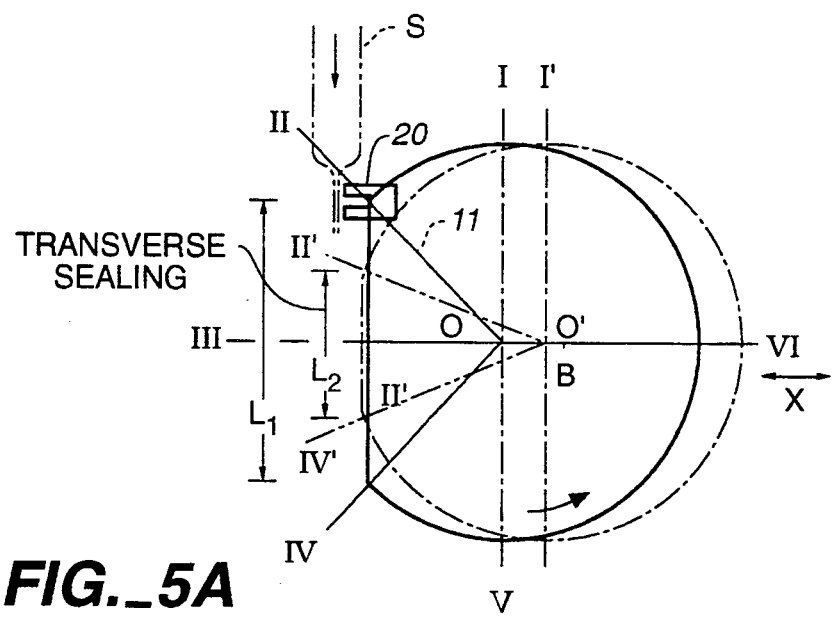
FIG._5A
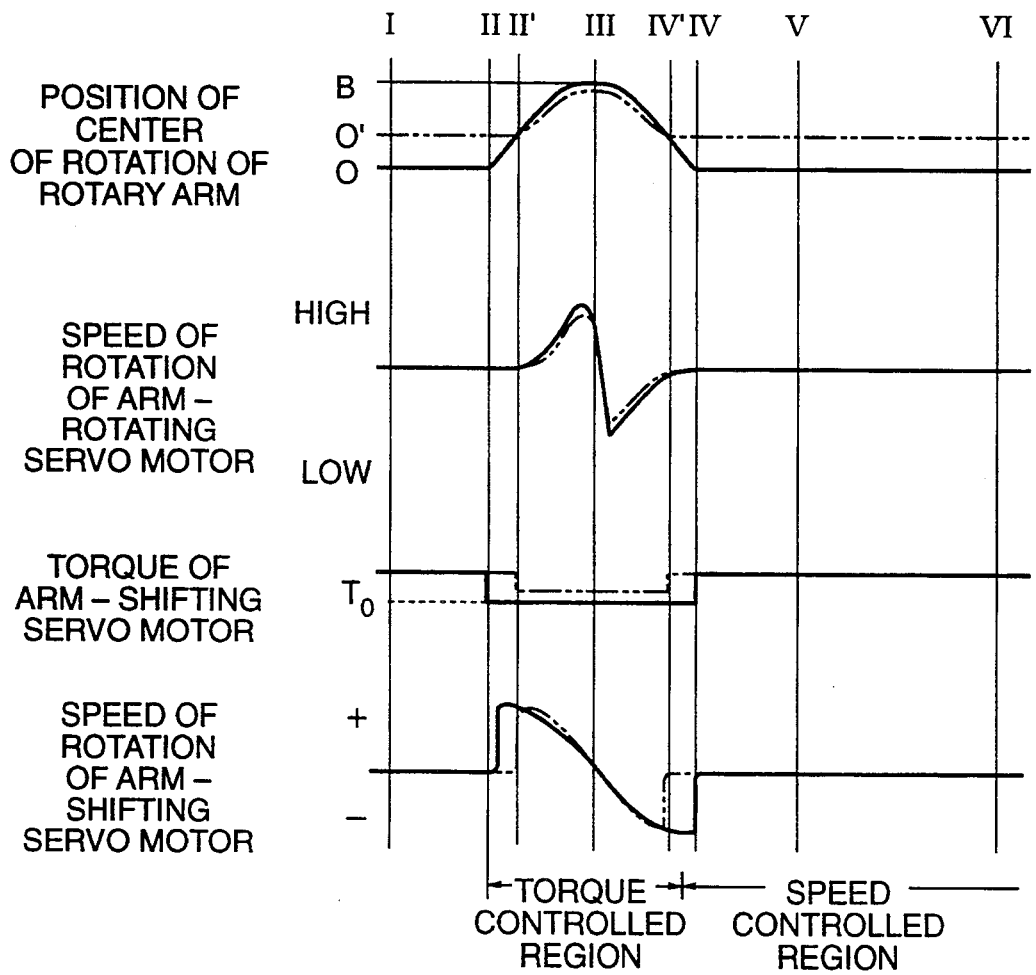
FIG._5B

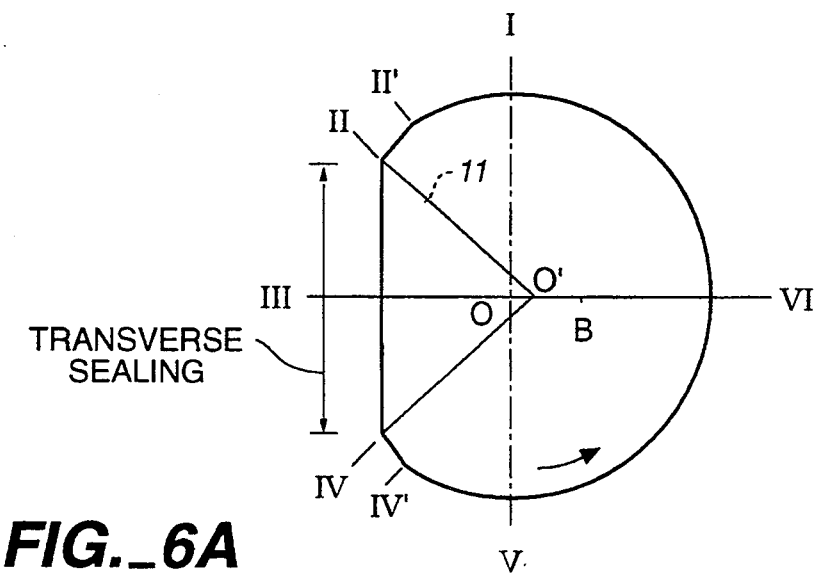
FIG._6A
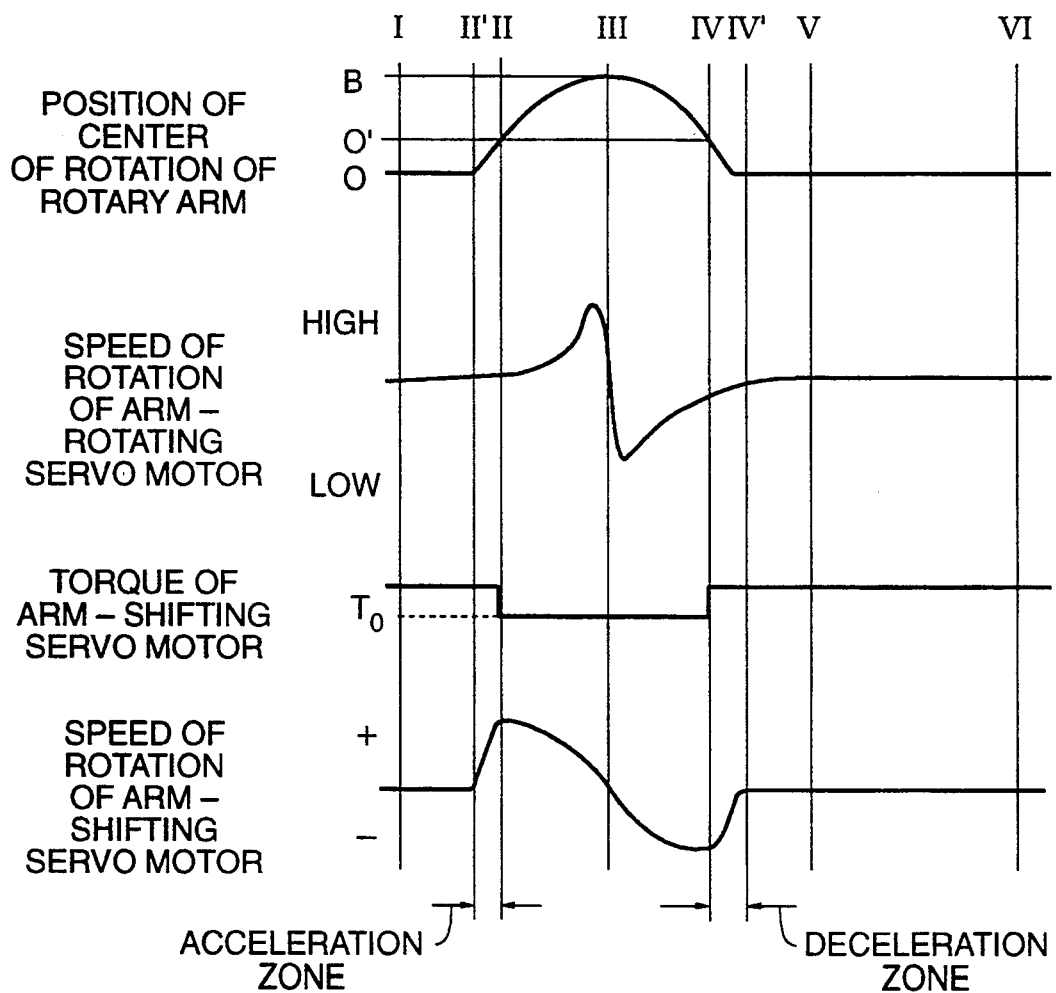
FIG._6B

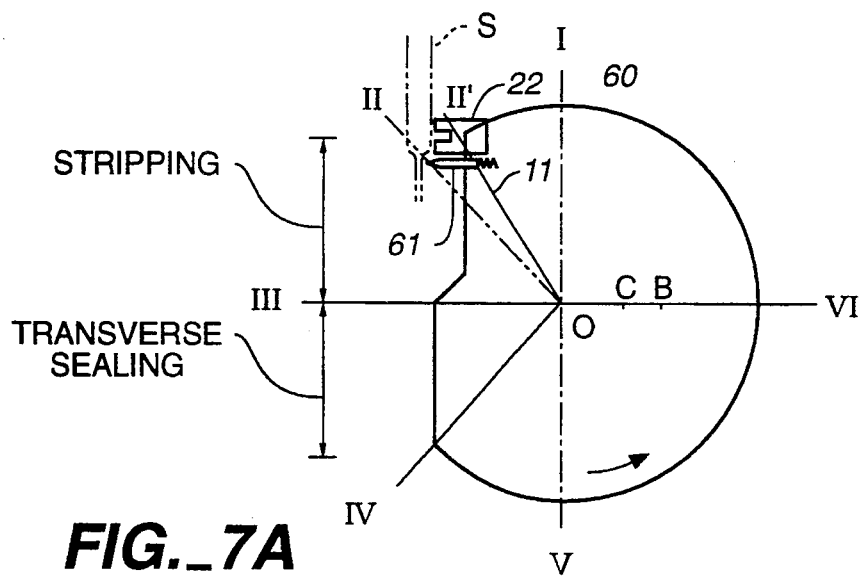
FIG._7A
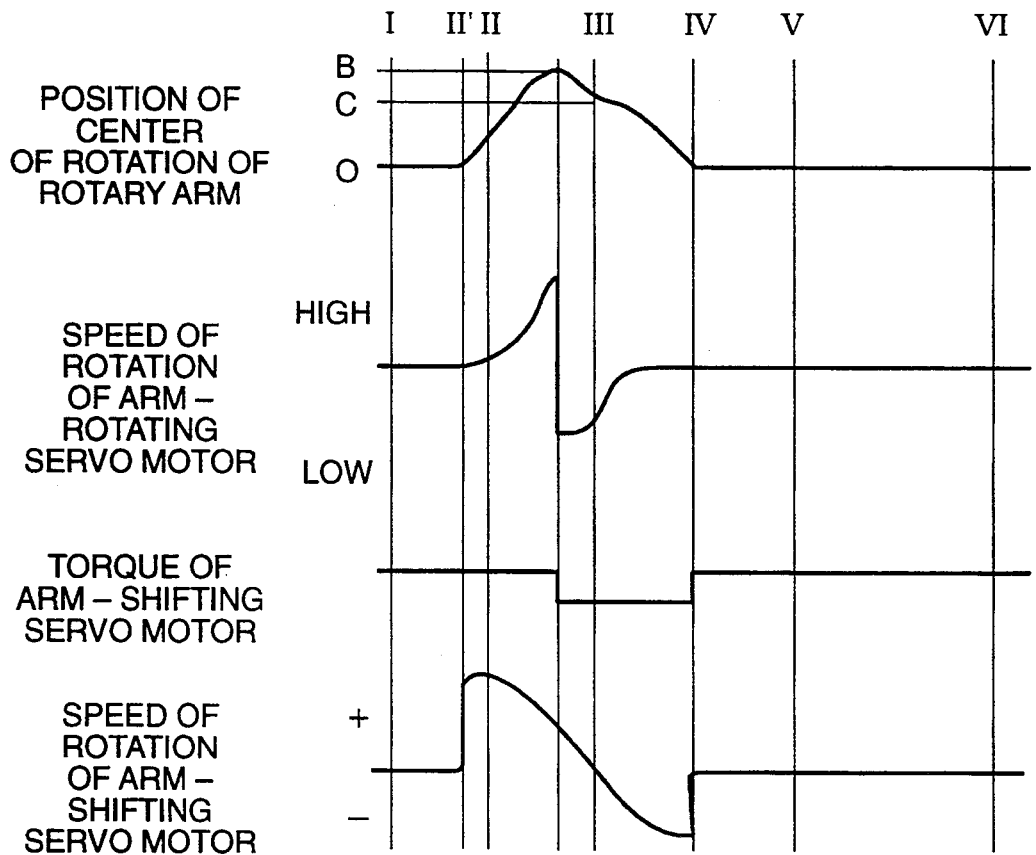
FIG._7B

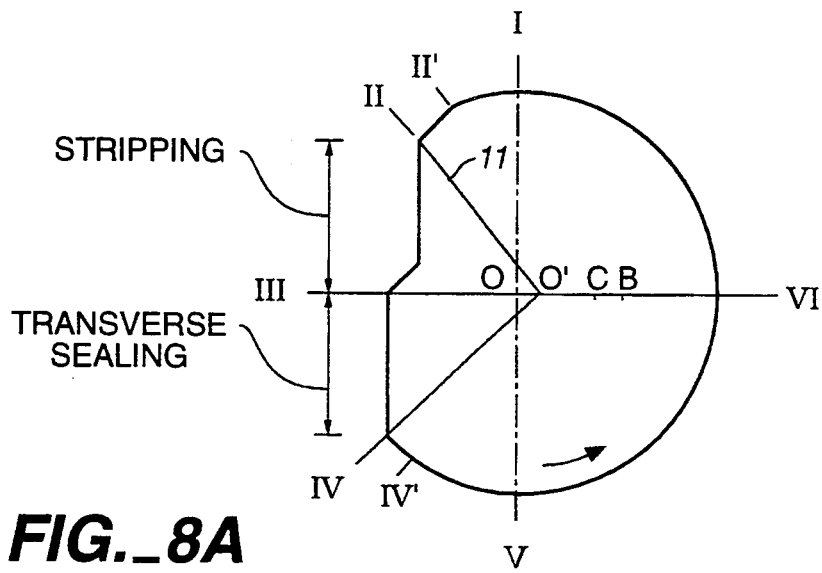
FIG._8A
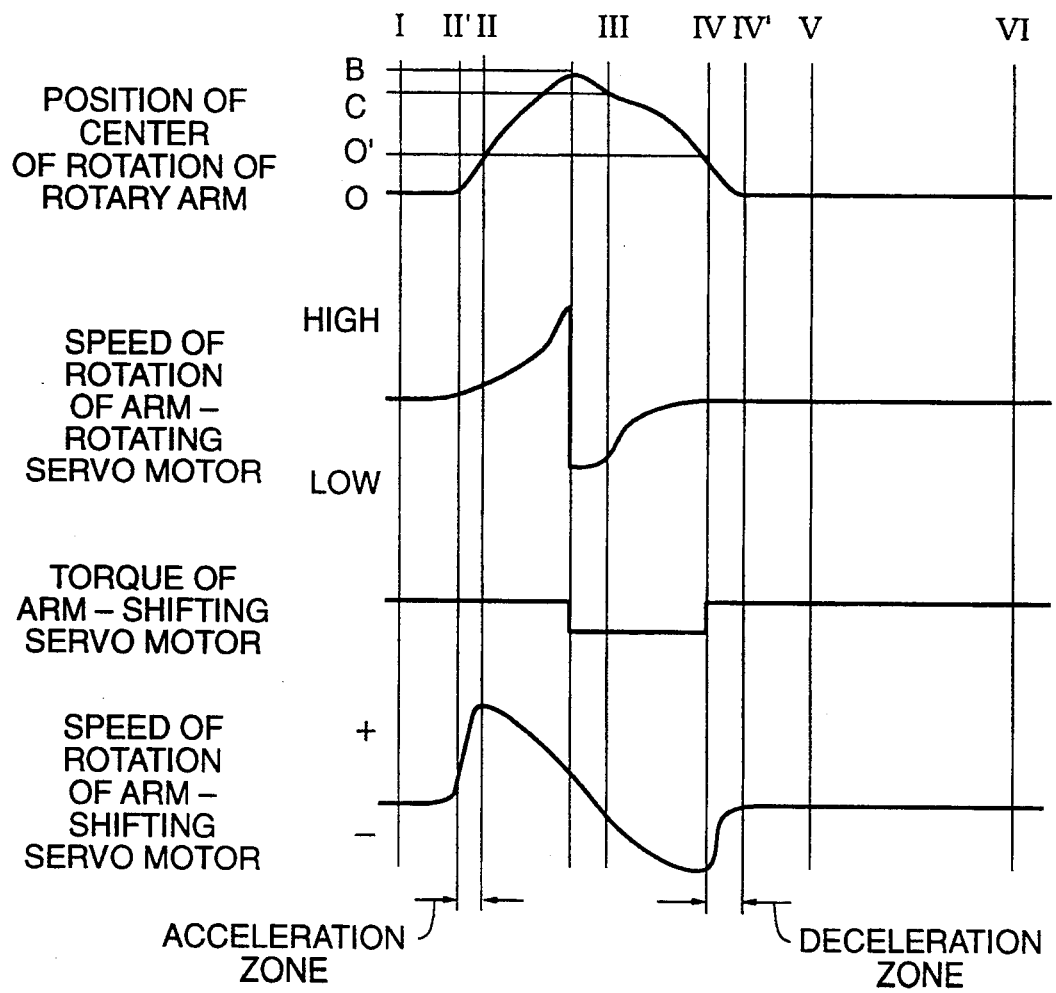
FIG._8B

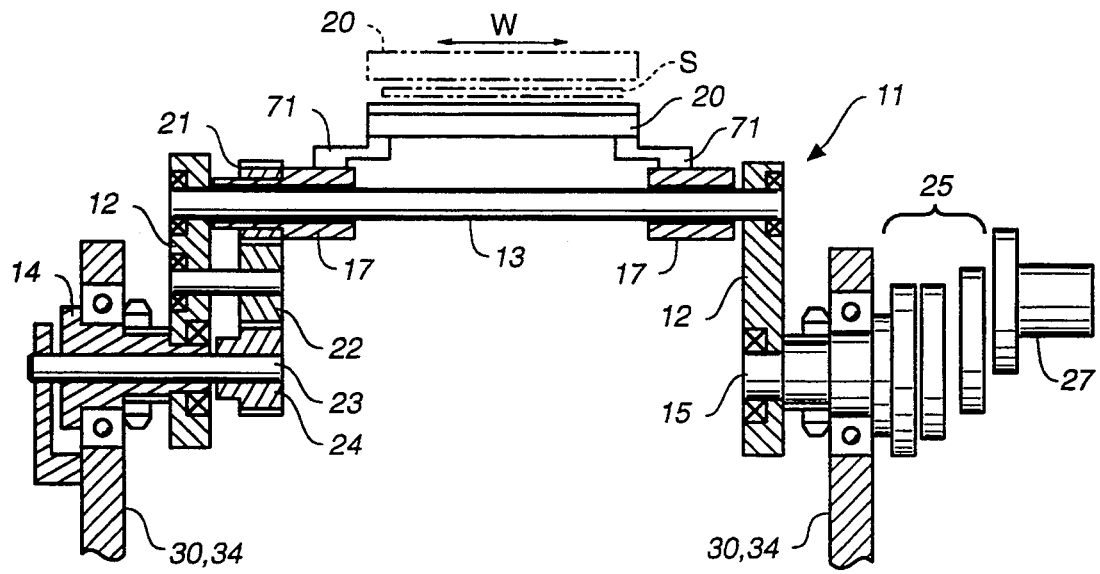
FIG._9
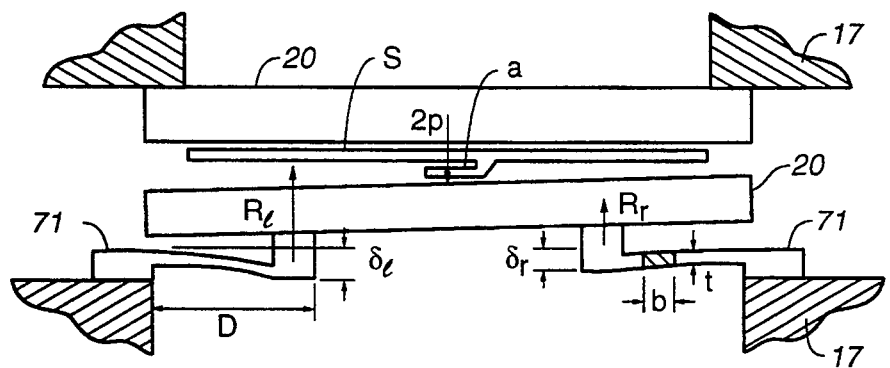
FIG._10
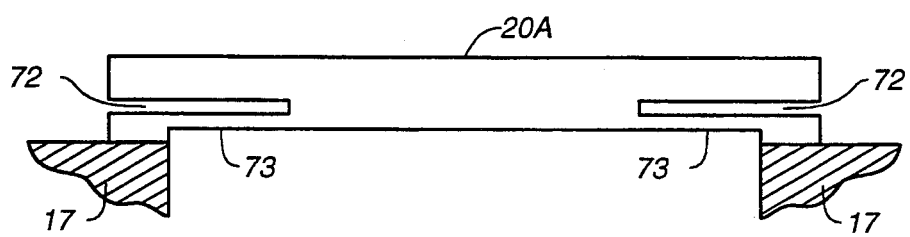
FIG._11

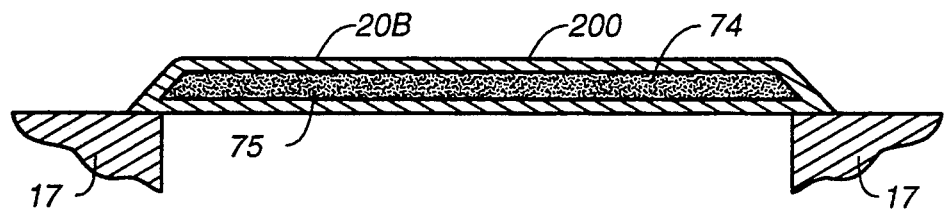
FIG._12
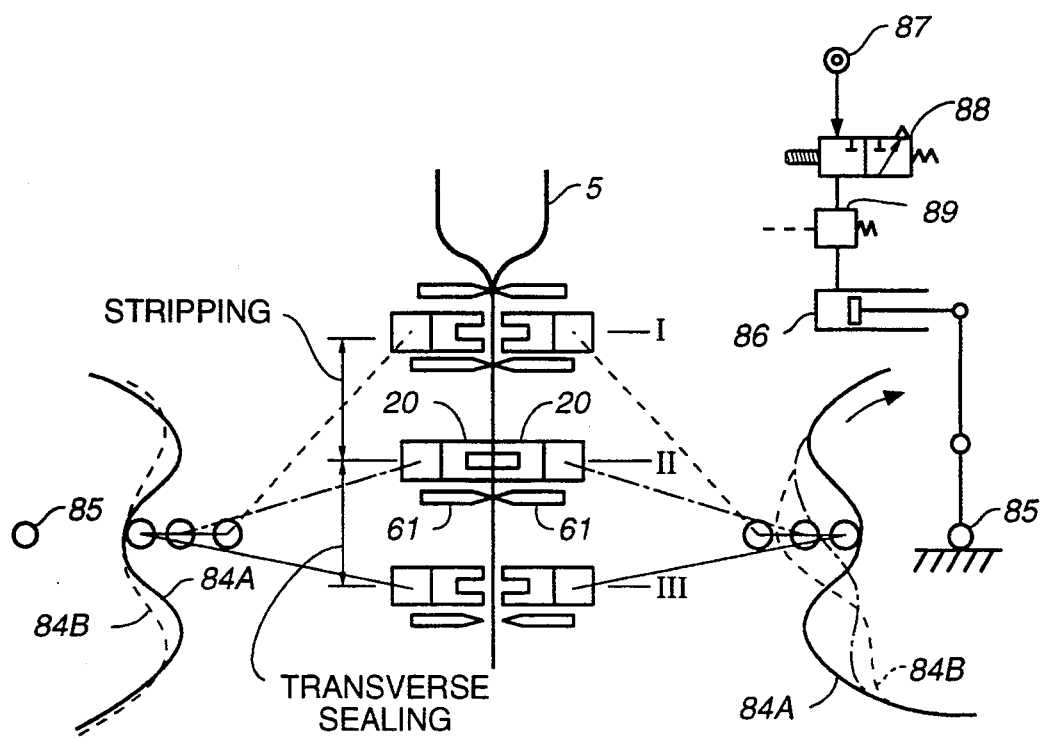
FIG._13

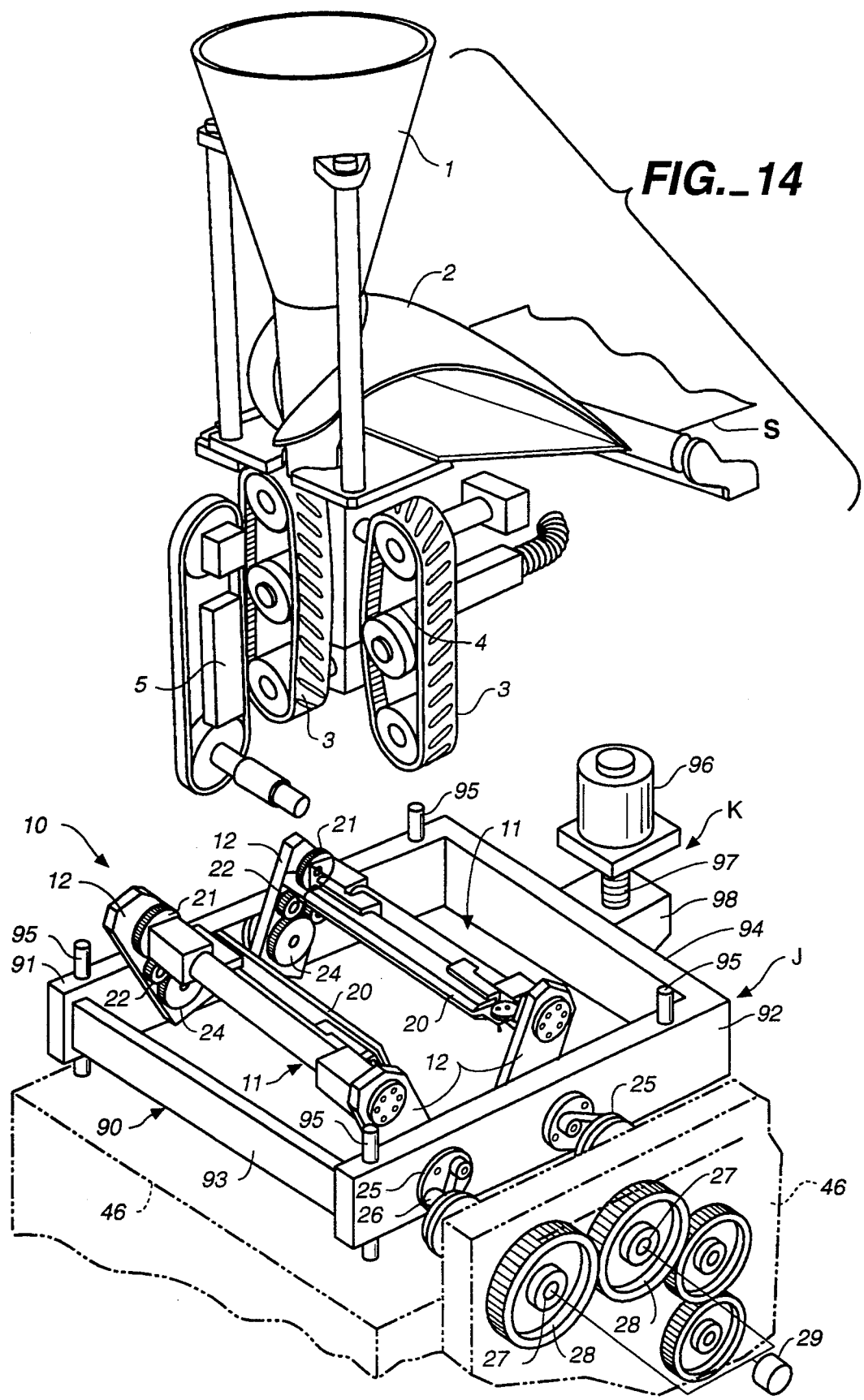
FIG._14

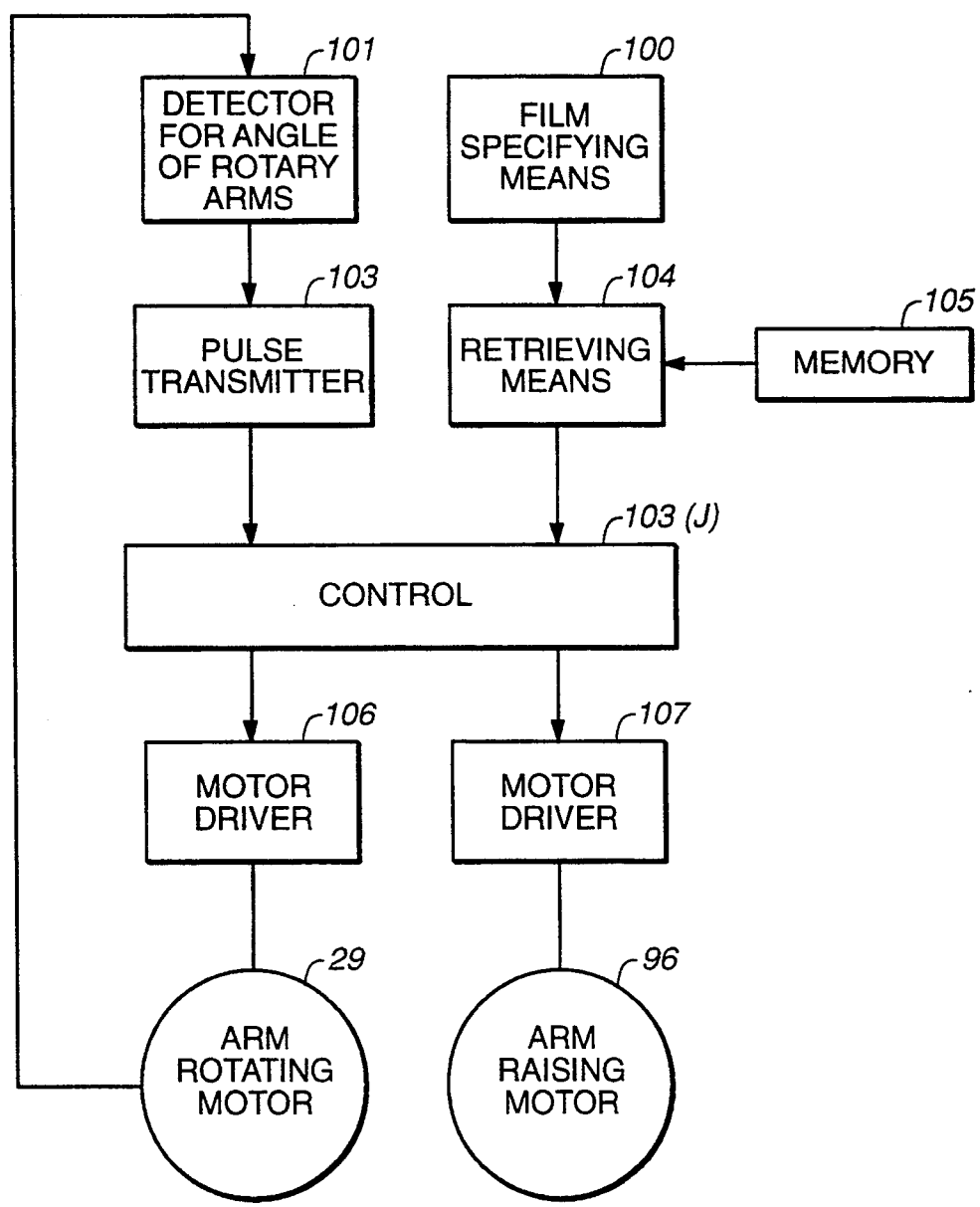
FIG._15

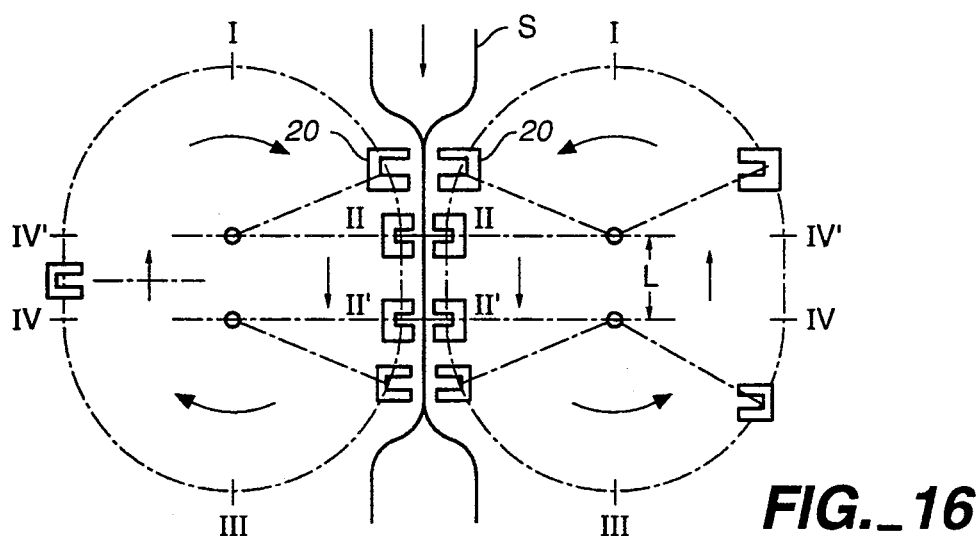
FIG._16
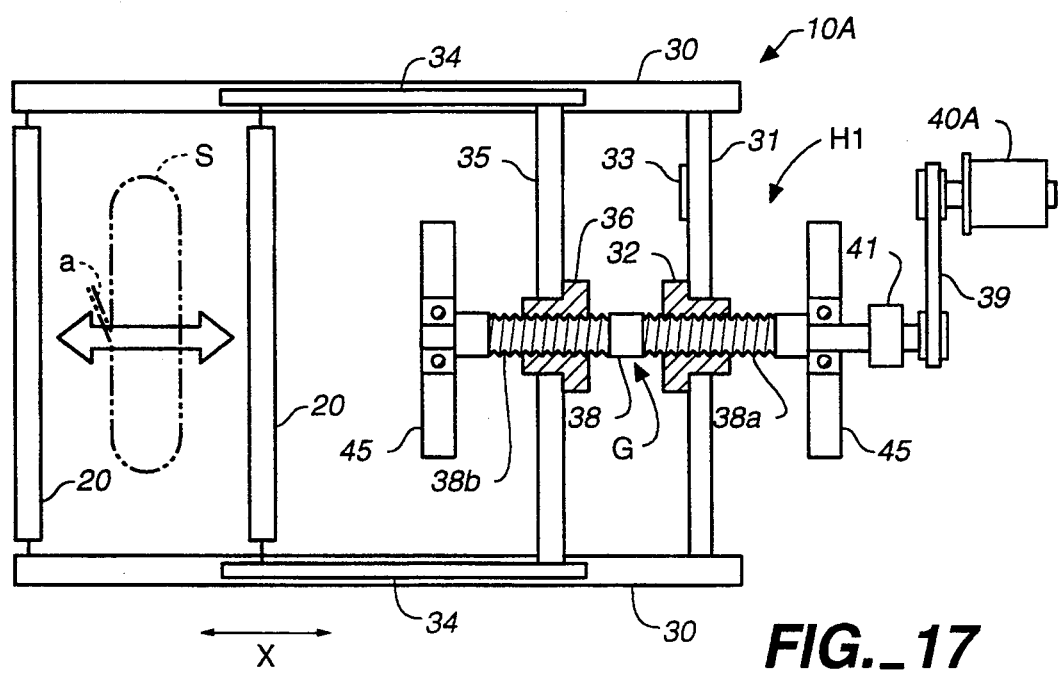
FIG._17
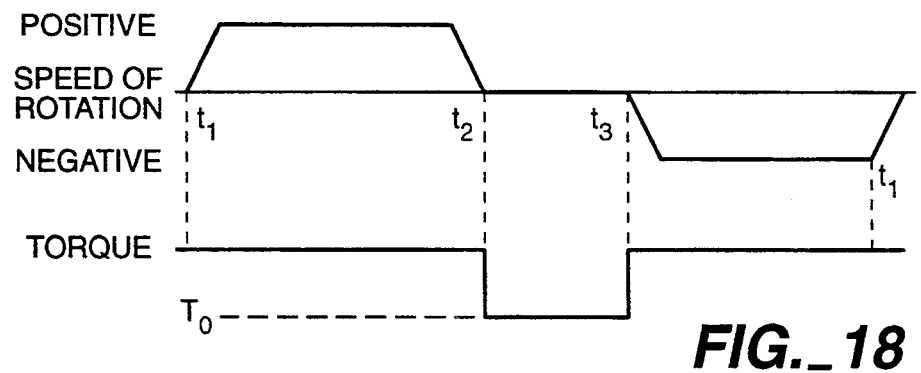
FIG._18

TRANSVERSE SEALER FOR PACKAGING MACHINE

BACKGROUND OF THE INVENTION

This invention relates to a transverse thermal sealer for sealing a packaging material used in a packaging machine for concurrently filling a bag with articles such as foods and making a packaged product.

A bag-making packaging machine for concurrently forming a bag, filling it with articles such as foods and making it into a packaged product, such as a so-called pillow-type packaging machine, is adapted to seal the mutually superposed longitudinal side edges of a belt-like elongated packaging material (hereinafter referred to as a film) while this film is being transformed into the shape of a bag by means of a former, and to thereafter transversely seal the bottom of the film, while the tubularly formed film is being pulled, by means of a pair of transverse thermal sealing means disposed below the outlet of the filling cylinder used for filling the tubular film with articles to be packaged. Since such a packaging machine is capable of simultaneously and continuously forming bags and filling them with articles to be packaged, it is considered an apparatus with high workability.

Japanese Patent Publication Tokkai 235006/87 disclosed an apparatus of the so-called rotary driving type adapted to cause the heating surfaces of its transverse sealing means to contact the film while the transverse sealing means are moved linearly in the direction in which the film is being pulled, such that a sufficiently long time can be spent for the transverse sealing process even if the period of cyclic packaging operation is shortened. For the purpose of causing the transverse sealing means to move in a linear trajectory, however, this apparatus makes use of D-shaped grooves to guide these means, while causing them to undergo a cyclic motion. In other words, their linear trajectory and the compressive force between them are uniquely determined, and the film may be subjected to an unreasonable force from them, depending on the thickness, material property and/or width of the film. As a result, the film may be damaged, or the apparatus may fail to reliably perform a transverse sealing process.

Packaging machines of the so-called intermittent driving type are also known. They are structurally simpler, although disadvantageous from the point of view of reducing the period of cyclic motion, and are characterized as pulling the film intermittently and carrying out the transverse sealing while the film is stopped. The method of using a hydraulic (oil-pressure) cylinder has been known in this connection for compressing the transverse sealing means against each other and adjusting the compressive force between them by controlling this pressure cylinder. Such a cylinder, however, tends to make the apparatus bigger as a whole, and there arises the problem of keeping the oil for the cylinder away from the articles to be packaged.

The present invention has been accomplished in view of these problems, and its first object is to provide a transverse sealer for a packaging machine of the rotary driving type (rotating type) capable of adjusting the compressive force between its transverse sealing means to a set level according to the thickness, material property and width of the film.

A second object of the invention is to eliminate the hydraulic cylinder from a packaging machine of the intermittent driving type such that the packaging machine can be made compact and the contamination by oil of articles to be packaged can be prevented.

SUMMARY OF THE INVENTION

A transverse sealer according to the present invention for a packaging machine, with which the first object mentioned above can be accomplished, functions to form a belt-like film into the shape of a bag and to seal it transversely to the direction of motion of the film after it is filled with articles to be packaged, and comprises a pair of transverse sealing means disposed opposite to each other across the path of the film and on the downstream side of a bag-forming means for transforming the film into a specified shape for forming a bag, a pair of rotary driving means for causing this pair of transverse sealing means to rotate in synchronism with and near each other in the same direction as that of the motion of the film, and a trajectory-compression adjusting means for not only causing the pair of transverse sealing means to move in a linear trajectory along the aforementioned path of the film by moving the rotary driving means away from or towards each other, but also maintaining the compressive force between the transverse sealing means at a specified level, while the film is being sandwiched between the transverse sealing means by the rotary driving means. With a transverse sealer thus structured, the trajectory-compression adjusting means causes the pair of transverse sealing means to move in a linear trajectory along the path of the film and maintains the compressive force therebetween to a desired level such that the film, which is being supplied continuously, can be dependably sealed in the transverse direction according to the thickness, material property and width of the film.

According to a preferred embodiment of the invention, there is also provided a stroke adjusting means for adjusting the distance of stroke by the transverse sealing means along the linear portion of their trajectory. In other words, a distance of stroke, or a sealing time, appropriate for the thickness, material property and width of the film can be selected for a suitable transverse sealing of the film.

According to another preferred embodiment of the invention, the trajectory-compression adjusting means is disposed so as to be movable in the direction in which the pair of transverse sealing means moves away from or towards each other. It comprises a pair of mobile frames supporting individually the pair of rotary driving means for receiving the reaction from the force of compression, a linear-to-rotary motion conversion means for converting the relative motion between the mobile frames due to the aforementioned reaction into a rotary motion, a separation-controlling motor for causing the pair of mobile frames to move in the aforementioned direction of motion away from or towards each other through this motion conversion means, and a control means for driving this separation-controlling motor at a constant set torque such that the pair of transverse sealing means can move in a specified trajectory including a linear section. With such a structure, the compressive force can be maintained at a level corresponding to the torque set for the separation-controlling motor. Since the trajectory-compression adjusting means has both the function of moving the pair of transverse sealing means in a desired trajectory and the function of maintaining the compression therebetween at a constant level, the structure of the machine as a whole can be made simpler than if these two functions are performed by two separate mechanisms. Since a motor is used instead of a hydraulic cylinder, furthermore, the apparatus can be made more compact and the possibility of contamination by oil is also eliminated.

According to still another preferred embodiment of the invention, the pair of mobile frames, the separation-controlling motor and the control means, of which the trajectory-compression adjusting means is comprised, also serve as parts of the stroke adjusting means. This additionally contributes to the reduction in size of the machine.

The stroke adjusting means may be structured differently, with a shifting means for shifting the pair of rotary driving means by a set distance in the direction of travel of the film when the transverse sealing means return to their starting positions for the sealing. With a structure like this, the control becomes easier because the pair of transverse sealing means follows a simple trajectory which is a combination of a straight line and a semicircular arc. This shifting means may be set so as to be movable in the direction of motion of the film and provided with a shifting frame for supporting the pair of rotary driving means and a longitudinal shift motor for moving this shifting frame in the same direction of motion. With this structure, too, the apparatus can be made compact and contamination by oil can be prevented because use is made of a motor instead of a hydraulic cylinder.

According to a further preferred embodiment of the present invention, there is also provided an acceleration-deceleration mode setting means for causing the pair of rotary driving means to gradually separate from each other before the transverse sealing means reach starting positions for sealing and to gradually move toward each other after the transverse sealing means reach their end positions of sealing. This contributes to a smooth movement of the transverse sealing mechanism because sudden motion of the rotary driving means at the starting and end positions for sealing can be eliminated.

According to a still further preferred embodiment of the invention, each of the transverse sealing means has a stripping plate and the trajectory-compression adjusting means includes a stripping mode setting means for setting the trajectory of the transverse sealing means such that the stripping plates will stroke the surfaces of the film prior to the sealing process in order to prevent the articles to be packaged from becoming trapped inside the sealed section of the film. This embodiment contributes to a dependable sealing by eliminating the possibility of articles getting trapped between the sealing surfaces.

According to still another preferred embodiment of the invention, at least one of the pair of transverse sealing means is provided with a returning means for pushing it towards the other of the transverse sealing means by an elastic restoring force proportional to displacement. With the returning means thus provided, the transverse sealing means, to which it is provided, can return to its normal position when it becomes sloped with respect to the other such that the distance between them changes. In this manner, pressure can be applied uniformly to the film from one position to another between the pair of transverse sealing means.

A transverse sealer according to the present invention for a packaging machine, with which the second object mentioned above can be accomplished, comprises a pair of transverse sealing means disposed opposite to each other across the path of the film and on the downstream side of a bag-forming means for transforming the film into a specified shape for forming a bag, and a compression adjusting means for not only causing the pair of transverse sealing means to move towards or away from each other so as to be able to sandwich a specified sealing area of the film between them for sealing, but also maintaining the compressive force between the transverse sealing means at a specified level. The compression adjusting means is disposed so as to be movable in the direction in which the pair of transverse sealing means moves away from or towards each other, and comprises a pair of mobile frames for supporting individually the pair of transverse sealing means and receiving the reaction of the force of compression, a linear-to-rotary motion conversion means for converting the relative motion between the mobile frames due to the aforementioned reaction into a rotary motion, and a separation-controlling motor for causing the pair of mobile frames to move in the aforementioned direction of motion away from or towards each other through this motion conversion means.

When a packaging machine of the intermittent driving type thus structured is used for thermal sealing while the film is stopped, the compressive force between the pair of transverse sealing means is maintained at a specified level. Thus, the machine can carry out transverse thermal sealing appropriately according to the thickness, material property and width of the film. Since a motor is used instead of a hydraulic cylinder, furthermore, the machine can be made compact and the problem of contamination of the articles to be packaged by oil can also be eliminated.

BRIEF DESCRIPTION OF THE DRAWINGS

FIG. 1 is a diagonal view of a pillow-type packaging machine with a transverse sealer according to a first embodiment of the present invention.

FIG. 2 is a frontal sectional view of the arm rotation mechanism of the sealer of FIG. 1.

FIG. 3 is a structural diagram showing the mechanism for moving the axis of the arm in the sealer of FIG. 1.

FIG. 4 is a block diagram of an example of operation control for the sealer of FIG. 1.

FIGS. 5a and 5b are timing diagrams for the basic transverse sealing mode of operation of the sealer of FIG. 1.

FIGS. 6a and 6b are timing diagrams for the end acceleration mode of transverse sealing operation of the sealer of FIG. 1.

FIGS. 7a and 7b are timing diagrams for the transverse mode of operation with stripping by the sealer of FIG. 1.

FIGS. 8a and 8b are timing diagrams for the end acceleration mode of transverse sealing operation with stripping by the sealer of FIG. 1.

FIG. 9 is a frontal sectional view of an essential portion of a transverse sealing mechanism according to a second embodiment of the present invention.

FIG. 10 is a diagram for showing the principles of the transverse sealing mechanism of FIG. 9.

FIG. 11 is a schematic structural diagram showing the structure of transverse seal jaw which is a variation on the second embodiment of the invention.

FIG. 12 is a schematic structural diagram showing the structure of transverse seal jaw which is another variation on the second embodiment of the invention.

FIG. 13 is a schematic structural diagram showing a transverse sealing mechanism according to a third embodiment of the invention.

FIG. 14 is a diagonal view of a packaging machine with a transverse sealer according to a fourth embodiment of the invention.

FIG. 15 is a block diagram of an example of operation control device for the mechanism of FIG. 14.

FIG. 16 is an action-timing diagram for the mechanism of FIG. 14.

FIG. 17 is a plan view of an essential portion of a device according to a fifth embodiment of the invention.

FIG. 18 is an action-timing diagram for the device of FIG. 17.

DETAILED DESCRIPTION OF PREFERRED EMBODIMENTS

Embodiments of the present invention will be described next with reference to the accompanying drawings.

FIG. 1 shows a pillow-type packaging machine equipped with a transverse sealing mechanism according to a first embodiment of the invention. This packaging machine is of the type without a filling cylinder and is structured such that after a belt-like film S is bent into a tubular form by means of a former 2 below a hopper 1 for making bags therefrom, a pair of pull-down belts 3 each disposed therebelow with a suction chamber 4 pulls its outer surface by the suction force to maintain it in the cylindrical form while a longitudinal sealing is performed along its mutually superposed longitudinal edges a by means of a longitudinal sealer 5. The film S is thereafter sent to a transverse sealer 10 to be described in detail below.

The transverse sealer 10, disposed below the pull-down belts 3, is for sealing the film S in a transverse direction across the direction in which it is transported, and is comprised of a pair of front and back rotary arms 11 (serving as rotary driving means) for supporting a pair of transverse seal jaws 20 opposite to each other across the path of travel of the film S such that they always face the same directions and undergo a rotary motion in synchronism with respect to each other, and pairs of left and right outer mobile frames 30 and inner mobile frames 34 capable of causing the axes of rotation of the rotary arms 11 to move towards or away from each other. The rotary arms 11 are adapted to rotate such that the directions R of their rotation will match the direction of motion A of the film S when the pair of transverse seal jaws 20 approaches each other.

As shown in FIG. 2, which is a sectional view for showing one of the rotary arms 11 in detail, each rotary arm 11 is of the form of a three-sided frame with left and right arms 12 connected to each other by a connecting shaft 13. One of the arms 12 has its end section affixed to a support shaft 14 protruding inwardly from the mobile frames 30 and 34 on one side (left-hand side in FIG. 2). The other of the arms 12 has its end section affixed to a power input shaft 15 protruding inwardly from the mobile frames 30 and 34 on the other side (right-hand side in FIG. 2). The rotary arms 11, thus structured, are adapted to be rotated around the shafts 14 and 15 by driving power transmitted through the power input shaft 15.

Numerals 17 indicate sleeves which are rotatably supported around the connecting shaft 13 and serve to support the seal jaw 20. The transverse seal jaw 20 for thermally sealing the tubularly formed film S in the transverse direction is affixed to these sleeves 17. One of the sleeves 17 is formed unistructurally with a planet gear 21.

A sun gear 24 is affixed to a fixed shaft 23 which penetrates the support shaft 14. The sun gear 24 and the planet gear 21 have the same number of gears and are coupled to each other through an idler gear 22.

Numeral 25 indicates a Schmidt coupling mechanism comprised of three disks 25a, 25b and 25c connected through a link 26 (shown in FIG. 1). The first disk 25a of each Schmidt coupling mechanism 25 is connected to a drive shaft 27 of an arm-rotating servo motor 29 and the third disk 25c of each Schmidt coupling mechanism 25 is connected to the power input shaft 15 such that the rotary motion of the drive shaft 27 is communicated to the power input shaft 15 independent of variations in the angle of rotation or transmitted torque or any axial shift between them. In this manner, the pair of rotary arms 11 can be rotated in mutually opposite directions through mutually engaging gears 28 (shown in FIG. 1) affixed on the drive shafts 27 for the Schmidt coupling mechanisms 25.

The outer and inner mobile frames 30 and 34 are for supporting the pair of rotary arms 11 such that the distance between them can be varied. The pairs of outer and inner mobile frames 30 and 34 are respectively connected to each other near the back ends by a connecting plate 31 and 35 in the form of a three-sided frame surrounding the rotary arms 11. They are assembled such that the outer mobile frames 30 can slide in the forward-backward direction on a main body frame 46 and that the inner mobile frames 34 can each slide inside one of the outer mobile frames 30 in the forward-backward direction.

Numeral 38 indicates a turnbuckle for moving the outer and inner mobile frames 30 and 34 in the forward-backward direction in a mutually coordinated manner such that the transverse seal jaws 20 can be moved in a desired D-shaped trajectory including a linear section. As shown in FIG. 3, this turnbuckle 38 is axially supported by a frame structure 45 provided between the outer and inner mobile frames 30 and 34. The turnbuckle 38 has a part 38a with a right-handed screw and a part 38b with a left-handed screw engaging respectively with the connecting plates 31 and 35 for the outer and inner mobile frames 30 and 34 through linear bearings 32 and 36 such that the outer and inner mobile frames 30 and 34 can be moved in mutually opposite directions to cause the pair of rotary arms 11 to move towards or away from each other by turning the turnbuckle 38 selectively in the positive or negative direction. The linear bearings 32 and 36 may be of a currently available type having many balls which engage with the screw parts 38a and 38b so as to add torque to an arm-shifting motor 40, or to turn the turnbuckle 38 when a force is applied to the mobile frames 30 and 34 in the forward-backward direction X by the reaction to the sealing pressure. The turnbuckle 38 and the linear bearings 32 and 36 may together be considered to form a linear-to-rotary motion conversion means G for converting the relative motion between the pairs of mobile frames 30 and 34 due to the aforementioned reaction to the compressive force between the pair of seal jaws 20 into a rotary motion.

Use as the aforementioned arm-shifting motor 40, which is connected to the turnbuckle 38 through a timing belt 39 as shown in FIG. 3, may be made of an AC servo motor capable of freely switching between torque-controlled and speed-controlled modes of operation. In the torque-controlled mode of operation, the torque of the motor 40 is kept at a specified level independent of its speed but this specified level can be varied suitably. In the speed-controlled mode of operation, its rotational speed can be made constant independent of the torque. As will be explained more in detail below, the arm-shifting motor 40 is controlled by a control circuit so as to be able to rotate in either direction in coordination with the arm-rotating servo motor 29 for rotating the rotary arms 11 such that the transverse seal jaws 20 will each travel in a trajectory including a straight portion of length L as shown in FIG. 5. In FIG. 1, numeral 47 indicates a partition plate.

FIG. 4 shows a circuit for controlling the arm-rotating servo motor 29 and the arm-shifting servo motor 40. FIGS. 5-8 show the motion of the rotary arm 11, as well as the operations of the arm-rotating and arm-shifting servo motors 29 and 40 in various modes of transverse sealing operation. In FIG. 4, numeral 51 indicates a detector for detecting the angle of rotation by the rotary arms 11 from a certain reference position I. This angle is detected from the angle of rotation of the arm-rotating servo motor 29, and a pulse signal proportional to the angle of rotation by the rotary arms 11 is transmitted from a pulse transmitter 52 connected to this detecting means 51 to a control unit 53. Numeral 48 indicates a mode-selecting means such as a keyboard for specifying a desired transverse sealing mode of operation. Numeral 49 indicates a film-specifying means such as a key board for specifying the material property, thickness, width, etc. of the film. As one of available transverse sealing modes, such as the "basic transverse sealing mode" shown in FIG. 5, the "end acceleration mode" shown in FIG. 6, the "transverse mode of operation with stripping" shown in FIG. 7, or the "end acceleration mode with stripping" shown in FIG. 8 is specified through the mode-selecting means 48 and the material property, width, etc. of the film are specified through the film-specifying means 49, an appropriate one of programs stored in a memory means 55 is retrieved therefrom through a retrieving means 54 and a program signal is outputted to the control unit 53 and executed. These programs stored in the memory means 55 are prepared for different modes of operation and according to different compression and distance of stroke at the time of sealing to be explained below.

As a pulse signal from the pulse transmitter 52 and a mode-dependent program from the memory means 55 are inputted into the control unit 53, mode-setting means, such as those corresponding to the basic mode (53a), the end acceleration mode (53b) and the stripping mode (53c), may be activated. The control unit 53 thereupon outputs control signals to a motor-driving means 56 in order to control the rotation of the arm-rotating servo motor 29 so as to vary the angular velocity of the rotary arms 11 during the transverse sealing process, and to another motor-driving means 57 in order to control the timing for switching the arm-shifting servo motor 40 so as to vary the positions of the axes of rotation of the rotary arms 11 during the transverse sealing process. The mobile frames 30 and 34, the linear-to-rotary motion conversion means G, the arm-shifting servo motor 40 and the control unit 53 may be regarded as constituting a trajectory-compression adjusting means H. Since the length of the transverse sealing process (that is, the stroke distance) varies as the centers of rotation of the rotary arms 11 are shifted, the remainders of the above with the linear-to-rotary motion conversion means G has been removed (that is, the mobile frames 30 and 34, the arm-shifting servo motor 40 and the control unit 53) may be regarded as constituting a stroke adjusting means J.

Next, the operation of the system thus structured will be described. Let us assume first that the basic transverse sealing mode, as shown in FIG. 5a with the length of transverse sealing given by L1, has been selected through the mode-selecting means 48 and that material property and thickness of the film S have been specified through the film-specifying means 49. In response, a program for such a basic transverse sealing mode of operation and corresponding to the specified material property and thickness of the film S is selected out of the many programs stored in the memory means 55 and retrieved by the retrieving means 54. The basic mode setting means 53a is activated according to the retrieved program, and the arm-shifting servo motor 40 begins to rotate in the positive direction after the rotary arms 11 begin to rotate from the starting position I and as they reach the starting position II for the transverse sealing process as shown in FIG. 5a. Subsequently, the arm-shifting servo motor 40 rotates in the negative direction from the mid-point III until the rotary arms 11 reach the end point IV of the transverse sealing process so as to move the pair of rotary arms 11 away from and towards each other through the outer and inner mobile frames 30 and 34 engaging the turnbuckle 38. In the meantime, the film S is sandwiched between the pair of transverse seal jaws 20 and moves at the same rate as its normal speed of travel.

Accordingly, the seal jaws 20 supported at the tips of the rotary arms 11 begin to travel in contact with the surface of the film S, that is, in straight lines. During this course of operation, the arm-shifting servo motor 40 is operated in the torque-controlled mode such that its torque is maintained at a specified constant level $T_0$, as shown in FIG. 5b. Thus, the compressive force on the film S from the seal jaws 20 can be kept as constant as possible. In the meantime, the arm-rotating servo motor 29 allows the speed of rotation of the rotary arms 11 to vary according to the torque applied thereon, causing the seal jaws 20 to move along the film S to thereby effect the transverse sealing. During this course of operation, the centers of rotation of the rotary arms 11 supporting the seal jaws 20 move in the forward-backward direction X, balancing the rotary torque of the turnbuckle 38 due to the reaction to the aforementioned compressive force against the constant torque $T_0$ of the servo motor 40 such that the compressive force is maintained at a constant level. This constant level of the compressive force can be adjusted by varying the magnitude of $T_0$.

If another basic transverse sealing mode with a shorter stroke distance L2 is specified, the arm-shifting servomotor 40 starts to rotate in the positive direction according to the corresponding program as shown by broken lines in FIGS. 5a and 5b, shifting the center of rotation from O to O', and thereafter causes the seal jaws 20 to move on a shorter straight path between points II' and IV'.

If the user specifies the end acceleration mode for causing the seal jaws 20 to accelerate and decelerate at the beginning and end of the transverse sealing, the end acceleration mode setting means 53b is activated. In this mode of operation, the arm-shifting servo motor 40 is gradually accelerated to gradually shift the positions of the center of rotation of the rotary arms from O to O' as shown in FIG. 6 before the starting point II is reached. After the end point IV is reached, the motor 40 is gradually decelerated. In other words, the program for this mode of operation provides an acceleration zone from II' to II and a deceleration zone from IV to IV' as shown in FIG. 6b. In this mode of operation, sudden separation of the pair of rotary arms 11 at the starting point II of the transverse sealing, as well as sudden approach at the end point IV, can be avoided, and the transverse sealer 10 can generally operate more smoothly.

The stripping mode setting means 53c is activated if the user specifies the stripping mode of operation shown in FIG. 7 wherein the articles inside the film S are "stripped", or caused to drop down, prior to the transverse sealing so as not to be caught between the seal jaws 20. In this mode of operation, the control unit 53 causes stripping plates 61 to be pressed against the film S by means of springs 60 when the rotary arms 11 are still separated from each other (at the starting point of stripping II') before reaching the starting point II of the transverse sealing. Thereafter, the stripping plates 61 are caused to move faster than the film S, thereby stripping the film S until the mid-point III (the end point of stripping) is reached. At the moment, the center of rotation of the rotary arms 11 is moved from B to C to thereby cause the seal jaws 20 to compress each other. From this moment until the end point IV of the transverse sealing is reached, the arm-shifting servo motor 40 is operated in the torque-controlled mode such that the seal jaws 20 are moved at the same rate as the normal speed of travel by the film S. With the transverse sealer 10 operated by such a program, articles to be packaged are prevented from being caught between the seal jaws 20 and the sealing operation can be accomplished dependably.

If the end acceleration mode of operation with stripping as shown in FIG. 8 is specified, the sealer 10 is operated with a program providing an acceleration zone from II' to II before the starting point of the stripping and a deceleration zone from IV to IV' after the end point IV for the transverse sealing.

As explained above by way of the embodiments described above with reference to FIGS. 1–8, transverse sealing can be performed on a continuously moving film S because the pair of sealing jaws 20 (serving as transverse sealing means) is caused to travel in a linear trajectory along the path of the film S by the aforementioned trajectory-compression adjusting means H. Since the compressive force between the pair of seal jaws 20 can be maintained at a constant level corresponding to a set magnitude of torque $T_0$ on the arm-shifting servo motor 40, the film S can be transversely sealed appropriately according to its thickness, material property, etc. Since the stroke distance, and hence the time duration of the sealing operation, can be selected appropriately by the stroke adjusting means J according to the thickness and material property of the film S, the sealing operation can be performed even more appropriately according to the present invention.

Since the aforementioned trajectory-compression adjusting means H has both the function of moving the pair of seal jaws 20 in a desired trajectory and the function of maintaining the compression therebetween at a constant level, the sealer 10 as a whole can be more simply structured than if these two functions are performed by two separate mechanisms. Since the motor 40 takes the place of a hydraulic cylinder, furthermore, the sealer can be made more compact and the possibility of contamination of the articles to be packaged by oil can be eliminated. The sealer 10 according to the present invention can be made compact also because the pairs of outer and inner mobile frames 30 and 34, the arm-shifting servo motor 40 and its control unit 53, which constitute a portion of the aforementioned trajectory-compression adjusting means H, also serve as the aforementioned stroke adjusting means J. Instead of the aforementioned linear-to-rotary motion conversion means G with a turnbuckle and linear bearings, use may also be made of an alternative mechanism with a link mechanism or groove cams.

FIG. 9 shows a second embodiment of the present invention characterized wherein the supporting mechanism for the seal jaws 20 is improved by adding a returning means. As shown in FIG. 9, wherein the same components as described above are indicated by the same numerals, the base ends of support springs 71 (serving as returning means) are attached to the inner edges of the pair of sleeves 17 rotatably supported by the connecting shaft 13 between the arms 12. These springs 71 are cantilevered and are for the purpose of applying a uniform compressive force to the film S over its entire width W. Their free ends extend inwardly toward each other and are attached to a seal jaw 20.

With the returning means 71 thus provided, even if the seal jaws 20 become sloped like a seesaw because of the longitudinally sealed edge portions of the film S caught in between as the seal jaws 20 are pressed against each other, these support springs 71 will individually bend and supply a restoring force proportional to its strain to cause the seal jaw 20 attached thereto to return towards the opposite seal jaw 20, thereby applying a uniform compressive force onto the film S.

As the pair of seal jaws 20 moves in D-shaped trajectories by the rotation of the arms 12 of the rotary arms 11 and the motion of the mobile frames 30 and 34 and reaches the starting point of the transverse sealing, coming into contact with each other with the film S sandwiched therebetween, the seal jaws 20 experience a force which tend to move them around the longitudinally sealed edges of the film S. When such a force is experienced by the seal jaws 20, each of the support springs 71 is bent according to the displacement of the seal jaw 20. At the same time, reactions from the support springs 71 are applied back onto the seal jaws 20 so as to press the film S uniformly to perform the transverse sealing.

This process will be explained more in detail with reference to FIG. 10 which shows the pair of seal jaws 20 sandwiching therebetween a film S having its longitudinally sealed edges a formed in three or four layers. In this situation, at least one of the pair of seal jaws 20 will assume a sloped position like a seesaw around the longitudinally sealed edges a. This slope can be expressed as a function of the strains of the springs 71. The strain $\delta$ is given by a formula as follows:

$$\delta = pA^3/12EI = pD^3/Ebt^3 \tag{1}$$

where D is the effective length of the cantilevered support spring 71, t is the thickness and b is the width of the plate of the spring, $2p$ is the load, and E and I are respectively the Young's modulus and the second-order cross-sectional moment of the spring 71. Its reaction force R is inversely proportional to the strain $\delta$ and given by $$R = Ebt^3\delta/D^3. \qquad (2)$$

Thus, if the strain of the left-hand and right-hand support springs 71 is respectively $\delta_l$ and $\delta_r$, their reaction forces $R_l$ and $R_r$ proportional respectively to $\delta_l$ and $\delta_r$ are applied to the seal jaw 20 towards the other seal jaw 20 opposite thereto.

Consider, for example, a load of 500 kg applied to a support spring 71 of effective length D=44 mm, plate thickness t=5 mm, plate width b=18 mm, and Young's modulus=$2.1 \times 10^4$ kg/mm$^2$, thereby causing a strain of 0.5 mm and 0.4 mm to the left-hand and right-hand springs 71, respectively. Formula (2) then shows that the support spring 71 on the left-hand side exerts a reaction force of $R_l$=278 kg to the seal jaw 20 and that the support spring 71 on the right-hand side exerts a reaction force of $R_r$=222 kg in the direction of returning to the normal position, providing locally uniform compression to the film S and restoring the strains in the springs 71.

FIG. 11 shows a support spring of a different form. A seal jaw 20A according to this embodiment has an inwardly extending slit 72 formed from each side section thereof, and the parts which become separated by these slits 72 from the main part of the seal jaw 20A are formed as cantilevered elastic support spring parts 73.

FIG. 12 shows a support spring of still another form. A seal jaw 20B according to this embodiment is formed as a hollow structure with an elastic hollow housing structure 200 such that the strain of the seal jaw 20B will be made up for by a reaction force proportional to the bending of the housing structure 200 itself. A fluid 75 with a low melting point such as lead may be sealed inside the hollow interior 74 of the housing structure 200 for providing a uniform thermal balance to the seal jaw 20B. In such a situation, the housing structure 200 serves as the aforementioned returning means. The support springs 71 and 73 and the hollow elastic structure 20B may be used only as one of the pair of seal jaws 20.

FIG. 13 shows still another transverse sealer according to a third embodiment of the invention. This sealer has both a seal jaw 20 and a stripping plate 61 provided at the tip of each rotary arm 11 such that the stripping plate 61 performs the stripping operation on the film S while the seal jaw 20 is on the first half of the straight line trajectory from I to III and the transverse sealing is carried out while the seal jaw 20 is on the second half of this trajectory.

Explained more in detail, means for allowing the seal jaws 20 to move in many different D-shaped trajectories having linear sections of different lengths (or many different stroke distances), or means for shifting the axes of rotation of the rotary arms 11 according to this embodiment of the invention comprises two cams 84A and 84B having different guide surfaces affixed to the same axis such that they rotate together and their rotary positions can be adjusted. At the same time, one or both of the cam axes 85 (only the one on the right-hand side according to the embodiment shown in FIG. 13) are subjected to a biasing force towards the other by means of an air cylinder 86 such that the pair of seal jaws 20 can apply an appropriate pressure on the film S while they are performing transverse sealing between the points II and III.

The air tube connecting the air cylinder 86 with an air supply source 87 is provided with an electromagnetic valve 88 which opens the air supply route only during the transverse sealing process between the points II and III and an external pilot type sequence valve 89 which is activated only when the contact pressure exceeds a set level such that the transverse sealing can be effected at a constant contact pressure. On the other hand, the arm-rotating servo motor is controlled so as to rotate at an increased speed during the stripping process between the points I and II. In this manner, the stripping can be completed quickly before the transverse sealing process is started.

In summary, the third embodiment of the invention makes use of the arm-rotating servo motor and arm-shifting cams 84A and 84B in coordination therewith such that the rotary arms 11 are separated from each other by the operation of these cams 84A and 84B while the seal jaws 20 are in the region for stripping operation between the points I and II and the air cylinder 86 is not operated. In the meantime, the speed of rotation of the arm-rotating servo motor is increased such that the stripping plates 61 will move in a straight trajectory faster than the normal speed of travel of the film S so as to effect required stripping thereon. When the seal jaws 20 start the transverse sealing process to be effected between the points II and III, the arm-rotating servo motor is rotated at a constant speed and the electromagnetic valve 88 is opened so as to introduce air into the air cylinder 86 through the external pilot type sequence valve 89. In this manner, an appropriate compressive force according to the thickness and material property of the film S is applied between the seal jaws 20 as the arm-shifting cams 84A and 84B are pressed towards the other cams 84A and 84B on the opposite side.

The stripping process between the points I and II is controlled by one of the pairs of cams 84B, while the transverse sealing process between the points II and III is controlled by the other pair of cams 84A. Thus, the stroke distances of these two processes I–II and II–III can be varied by controlling the motion of the cams 84A and 84B. These pairs of cams 84A and 84B, however, may be replaced by different means such as air cylinders for shifting the axes of rotation.

FIG. 14 shows still another transverse sealer according to a fourth embodiment of the present invention characterized as having a shifting means K for shifting the positions of the rotary arms 11 supporting the seal jaws 20 in the direction of motion of the film S by a specified stroke distance during the transverse sealing process. A pair of side boards 91 and 92 is provided to hold the base parts of the rotary arms 11 and is connected to each other by a pair of connecting boards 93 and 94 to form a mobile frame 90 surrounding the rotary arms 11 and adapted to slide vertically upward and downward, guided by four guide rods 95 provided to the main body frame 46. Numeral 96 indicates a driving motor (or an arm-raising motor) for moving the mobile frame 90 upwards and downwards for moving the seal jaws 20 in elliptical trajectories of a specified shape. An AC servo motor capable of changing the direction of rotation at a specified timing may be used as this driving motor 96. The aforementioned shifting means K may be regarded as consisting of the mobile frame 90, the guide rods 95 and the driving motor 96. Every time the seal jaws 20 come near the mutually contacting positions or the most distantly separated positions, a control unit to be described below causes the driving motor 96 to rotate in the positive or negative direction to thereby move the rotary arms 11 upward or downward by a specified distance through a bracket 98 on the mobile frame 90 engaging a screw bar 97 serving as the drive shaft of the driving motor 96. The other components shown in FIG. 14 are the same as those shown in FIG. 1 and hence are indicated by the same numerals.

FIG. 15 shows a circuit for controlling the arm-rotating motor 29 and the arm-raising motor 96, and FIG. 16 is for showing the movement of the rotary arms 11 by their coordinated operations. Numeral 101 in FIG. 15 indicates a detector for detecting the angle of rotation by the rotary arms 11 from a certain reference position I. This angle is detected from the angle of rotation of the arm-rotating motor 29, and a pulse signal proportional to the angle of rotation by the rotary arms 11 is transmitted from a pulse transmitter 102 connected to this detecting means 101 to a control unit 103. Numeral 100 indicates a film-specifying means such as a key board for specifying the material property, width, thickness, etc. of the film. If the width of the film, etc. are specified, a retrieving means 104 is activated and retrieves a corresponding program out of many stored in a memory 105, outputting it to the control unit 103 to have it carried out. When the pulse signal from the pulse transmitter 102 and a signal from the film-specifying means 100 are received, the control unit 103 outputs a control signal to the motor-driving means 106 to control the rotary motion of the arm-rotating motor 29 so as to vary the angular speed of the rotary arms 11 during the course of transverse sealing. At the same time, whenever the rotary arms 11 reach the transverse sealing zone II–II' or the corresponding zone IV–IV' in their upward trajectory with reference to FIG. 16, a control signal is outputted to another motor-driving means 107 to control the switching timing of the arm-raising motor 96 so as to rotate this motor 96 by an angle corresponding to a specified stroke distance L. The aforementioned shifting means K and the control unit 103 together may be regarded as constituting the stroke adjusting means J.

Next the operation of the sealer thus structured will be explained. To start, the material property, thickness and/or width of the film S is specified through the film-specifying means 104. In response, the arm-raising motor 96 starts to rotate in the positive direction according to a preliminarily retrieved program when the rotary arms 11, starting its motion from the preliminarily determined starting point I, reaches the starting points II for the transverse sealing. The mobile frame 90 is thereby lowered at the same speed as that of the film S in its direction of motion A by a distance of stroke L determined by the material property, etc. of the film S. As a result, the seal jaws 20 supported by the rotary arms 11 begin to move downward in contact with the film S over a stroke distance L determined by the specified width, material property or thickness of the film S, while the arm-rotating motor 29 increases and/or decreases its rotational speed according to the variation on its torque, so as to carry out the transverse sealing. When the transverse sealing is completed at the end points II', the seal jaws 20 continue to rotate further and when they reach the points IV where they are farthest apart on their trajectories, the arm-raising motor 96 begin to rotate in the negative direction according to the program, raising the rotary arms 11 upwards back to their starting positions.

The fourth embodiment of the invention is advantageous because the seal jaws 20 each move in a relatively simpler trajectory made of a circular arc and a straight line segment instead of a D-shaped trajectory as in the case of the third embodiment of the invention. As a result, control of the motion is simpler.

Although the fourth embodiment of the invention was described above as using the screw bar 97 of the arm-raising motor 96 in order to raise and lower the mobile frame 90 and the rotary arms 11, other mechanisms for raising and lowering the mobile frame 90 may be substituted if capable of varying the stroke distance L of the mobile frame 90 according to the material property, etc. of the film S, such as a mechanism with a rack and a pinion. If necessary, furthermore, a sealer according to the fourth embodiment of the invention may be controlled such that there will be no relative motion between the seal jaws 20 and the film S throughout the distance between the points II and II' by stopping the arm-rotating motor 29 while the arm-raising motor 96 is operating.

The first through fourth embodiments of the present invention described above relate to transverse sealers of the type causing seal jaws to move in generally circular trajectories such that the transverse sealing can be effected while the film S is being transported. In contrast, FIG. 17 shows a fifth embodiment of the present invention related to a transverse sealer 10A of the intermittent driving type characterized as stopping the transportation of the film S intermittently and carrying out the transverse sealing only while the film S is temporarily stopped.

With reference to FIG. 17, the transverse sealer 10A according to the fifth embodiment of the invention supports its seal jaws 20 directly by the outer and inner mobile frames 30 and 34 without using any rotary arms. Thus, the pair of seal jaws 20 can be moved towards or away from each other by means of a jaw-shifting servo motor 40A such that the film S is sandwiched between them and the transverse sealing can be effected while the seal jaws 20 are in their mutually approached condition. The principle of mechanism for moving the seal jaws towards and away from each other is the same as that explained above with reference to FIG. 3. With reference still to FIG. 17, the linear-to-rotary motion conversion means G comprised of the pairs of outer and inner mobile frames 30 and 34, the turnbuckle 38 and the linear bearings 32 and 36, and the jaw-shifting servo motor 40A together may be regarded as constituting a compression-adjusting means H1.

As shown in FIG. 18, the jaw-shifting servo motor 40A according to the fifth embodiment of the invention rotates in the positive direction from time $t_1$ when the pair of seal jaws 20 is farthest apart from each other until time $t_2$ when it comes in contact with the film S to advance the seal jaws 20 in the positive direction. In the meantime, the motor 40A is operated in the speed-controlled mode such that its rotational speed will remain constant independent of changes in its torque. During the sealing process from time $t_2$ until time $t_3$, the servo motor 40A is controlled to produce a specified torque $T_0$. Since the rotary torque of the turnbuckle 38 shown in FIG. 17 due to the reaction force to the compression between the seal jaws 20 is applied to the servo motor 40A in this situation, the servo motor 40A stops when the aforementioned rotary torque of the turnbuckle 38 is greater than the specified torque $T_0$ of the servo motor 40A but the servo motor 40A turns in the positive or negative direction, when the rotary torque of the turnbuckle 38 is smaller than $T_0$, so that the compression between the seal jaws 20 will be adjusted corresponding to the specified torque $T_0$.

Thus, when a thermal sealing process is carried out with a packaging machine of an intermittent driving type while the film S is temporarily stopped, the compression force between the pair of seal jaws 20 can be maintained at a specified level by means of the aforementioned compression-adjusting means H1. As a result, the transverse sealing process can be appropriately carried out on a film according to its thickness, material property, and width. Since use is made of a motor instead of a hydraulic cylinder, the sealer can be made compact and there is no possibility of contamination of the articles by oil. It now goes without saying that returning means of types similar to those shown at 71, 73 and 200 as shown in FIGS. 9–12 may be provided to the seal jaws 20 of this fifth embodiment of the invention.

Although the first through fifth embodiments of the present invention described above all relate to a transverse sealer to be used in a packaging machine of a vertical pillow type, it should be clear that the transverse sealer according to the present invention can be used also in a horizontal pillow type packaging machine. In addition, the transverse sealers of the present invention can also be used with a packaging machine of a three-side sealing type adapted to fold the film into two, to vertically seal its superposed edges longitudinally and then to transversely seal it at two places or of a four-side sealing type adapted to perform a vertical sealing at two places along the superposed edges and also along the opposite side and then to perform transverse sealing at two places.

It also goes without saying that the present invention is applicable not only to machines for packaging food articles but also to packaging machines for industrial parts or products.

What is claimed is:

1. A transverse sealer for a packaging machine for sealing a bag in a transverse direction after said bag is filled with articles to be packaged, said bag being made from a belt-like elongated film moving on a transportation path in an film-transporting direction, said transverse direction being transverse to said film-transporting direction, said transverse sealer comprising:
   a pair of transverse sealing means disposed downstream to bag-forming means for transforming said film into a specified shape for forming a bag and opposite to each other on mutually opposite sides of said transportation path of said film;
   a pair of rotary driving means for causing said pair of transverse sealing means to rotate in synchronism with each other such that said transverse sealing means move along said film-transporting direction when said transverse sealing means are near each other; and
   a trajectory-compression adjusting means for causing said pair of transverse sealing means to move on straight trajectories along said transportation path of said film by causing said pair of rotary driving means to move towards and away from each other and maintaining a compressive force between said pair of transverse sealing means at a specified level while said pair of rotary driving means causes said pair of transverse sealing means to sandwich and compress said film therebetween.

2. The transverse sealer of claim 1 further comprising a stroke adjusting means for adjusting the distance of stroke by said transverse sealing means along said straight trajectories.

3. The transverse sealer of claim 1 wherein said trajectory-compression adjusting means includes:
   a pair of mobile frames which are movable in an approach-separation direction in which said pair of transverse sealing means moves towards and away from each other, each supporting one of said pair of rotary driving means, and receiving the reaction of said compressive force;
   a linear-to-rotary motion conversion means for converting the relative motion between said pair of mobile frames due to said reaction into a rotary motion;
   an approach-separation motor for causing said pair of mobile frames in said approach-separation direction through said linear-to-rotary motion conversion means; and
   a control means for causing said approach-separation motor to rotate at a specified torque to thereby cause said pair of transverse sealing means to travel in specified trajectories including said straight trajectories.

4. The transverse sealer of claim 2 wherein said stroke adjusting means includes:
   a pair of mobile frames, said mobile frames being movable in an approach-separation direction in which said pair of transverse sealing means move towards and away from each other, and said mobile frames each supporting one of said pair of rotary driving means;
   an approach-separation motor for causing said pair of mobile frames to move in said approach-separation direction; and
   a control means for controlling said approach-separation motor to thereby cause said pair of transverse sealing means to travel in specified trajectories including said straight trajectories having a specified length.

5. The transverse sealer of claim 2 wherein said stroke adjusting means includes a shifting means for moving said pair of rotary driving means by a specified distance along said film-transporting direction when said transverse sealing means have rotatingly reached starting positions of transverse sealing.

6. The transverse sealer of claim 5 wherein said shifting means include:
   a mobile frame which is movable in said film-transporting direction and supports said pair of rotary driving means; and
   an arm-raising motor for moving said mobile frame in said film-transporting direction.

7. The transverse sealer of claim 1 wherein said trajectory-compression adjusting means include a acceleration-mode setting means for causing said pair of rotary driving means to gradually move away from each other before said pair of transverse sealing means reaches starting positions of transverse sealing and to gradually move toward each other after said pair of transverse sealing means reaches end positions of said transverse sealing.

8. The transverse sealer of claim 1 wherein each of said transverse sealing means has a sealing surface for contacting said film and includes a stripping plate protruding further towards said film than said sealing surface, and said trajectory-compression adjusting means includes a stripping-mode setting means for causing said film to be sandwiched between the pair of said stripping plates before the sealing surfaces of said pair of transverse sealing means reach starting positions of transverse sealing and to strip said film by causing said pair of transverse sealing means to move faster than said film while said film remains sandwiched between said stripping plates.

9. The transverse sealer of claim 1 wherein at least one of said pair of transverse sealing means has attached thereto a returning means for pressing said one transverse sealing means in the direction towards the other of said pair of transverse sealing means by a restorative elastic force proportional to the strain of said returning means.

10. A transverse sealer for a packaging machine for sealing a bag in a transverse direction after said bag is filled with articles to be packaged, said bag being made from a belt-like elongated film moving on a transportation path in an film-transporting direction, said transverse direction being transverse to said film-transporting direction, said transverse sealer comprising:
   a pair of transverse sealing means disposed downstream to bag-forming means for transforming said film into a specified shape for forming a bag and opposite to each other on mutually opposite side of said transportation path of said film; and
   a compression adjusting means both for moving said pair of transverse sealing means in an approach-separation direction towards and away from each other to thereby sandwich said film at a specified seal position thereon for thermal sealing and for maintaining a compressive force between said pair of transverse sealing means at a specified level;
   said compression adjusting means comprising:
   a pair of mobile frames which are movable in an approach-separation direction in which said pair of transverse sealing means moves towards and away from each other, each supporting one of said transverse sealing means and receiving the reaction force to said compressive force;
   a linear-to-rotary motion conversion means for converting the relative motion between said pair of mobile frames due to said reaction force into a rotary motion; and
   a frame-moving motor for moving said pair of mobile frames towards and away from each other in said approach-separation direction through said linear-to-rotary motion conversion means.

11. The transverse sealer of claim 10 wherein at least one of said pair of transverse sealing means has attached thereto a returning means for pressing said one transverse sealing means in the direction towards the other of said pair of transverse sealing means by a restorative elastic force proportional to the strain of said returning means.

12. A transverse sealer for a packaging machine for sealing a bag in a transverse direction after said bag is filled with articles to be packaged, said bag being made from a belt-like elongated film moving on a transportation path in an film-transporting direction, said transverse direction being transverse to said film-transporting direction, said transverse sealer comprising:
   a pair of transverse sealing means disposed downstream to bag-forming means for transforming said film into a specified shape for forming a bag and opposite to each other on mutually opposite sides of said transportation path of said film;
   a pair of rotary driving means for causing said pair of transverse sealing means to rotate in synchronism with each other such that said transverse sealing means move along said film-transporting direction when said transverse sealing means are near each other; and
   a trajectory-compression adjusting means for causing said pair of transverse sealing means to move on straight trajectories along said transportation path of said film by causing said pair of rotary driving means to move towards and away from each other and maintaining a compressive force between said pair of transverse sealing means at a specified level while said transverse sealing means and said film move continuously along said transportation path and said pair of rotary driving means causes said pair of transverse sealing means to sandwich and compress said film therebetween.

13. The transverse sealer of claim 12 further comprising a stroke adjusting means for adjusting the distance of stroke by said transverse sealing means along said straight trajectories.

14. The transverse sealer of claim 12 wherein said trajectory-compression adjusting means includes:
   a pair of mobile frames which are movable in an approach-separation direction in which said pair of transverse sealing means moves towards and away from each other, each supporting one of said pair of rotary driving means, and receiving the reaction of said compressive force;
   a linear-to-rotary motion conversion means for converting the relative motion between said pair of mobile frames due to said reaction into a rotary motion;
   an approach-separation motor for causing said pair of mobile frames in said approach-separation direction through said linear-to-rotary motion conversion means; and
   a control means for causing said approach-separation motor to rotate at a specified torque to thereby cause said pair of transverse sealing means to travel in specified trajectories including said straight trajectories.

15. The transverse sealer of claim 13 wherein said stroke adjusting means includes:
   a pair of mobile frames, said mobile frames being movable in an approach-separation direction in which said pair of transverse sealing means move towards and away from each other, and said mobile frames each supporting one of said pair of rotary driving means;
   an approach-separation motor for causing said pair of mobile frames to move in said approach-separation direction; and
   a control means for controlling said approach-separation motor to thereby cause said pair of transverse sealing means to travel in specified trajectories including said straight trajectories having a specified length.

16. The transverse sealer of claim 13 wherein said stroke adjusting means includes a shifting means for moving said pair of rotary driving means by a specified distance along said film-transporting direction when said transverse sealing means have rotatingly reached starting positions of transverse sealing.

17. The transverse sealer of claim 16 wherein said shifting means include:
   a mobile frame which is movable in said film-transporting direction and supports said pair of rotary driving means; and
   an arm-raising motor for moving said mobile frame in said film-transporting direction.

18. The transverse sealer of claim 12 wherein said trajectory-compression adjusting means include a acceleration-mode setting means for causing said pair of rotary driving means to gradually move away from each other before said pair of transverse sealing means reaches starting positions of transverse sealing and to gradually move toward each other after said pair of transverse sealing means reaches end positions of said transverse sealing.

19. The transverse sealer of claim 12 wherein each of said transverse sealing means has a sealing surface for contacting said film and includes a stripping plate protruding further towards said film than said sealing surface, and said trajectory-compression adjusting means includes a stripping-mode setting means for causing said film to be sandwiched between the pair of said stripping plates before the sealing surfaces of said pair of transverse sealing means reach starting positions of transverse sealing and to strip said film by causing said pair of transverse sealing means to move faster than said film while said film remains sandwiched between said stripping plates.

20. The transverse sealer of claim 12 wherein at least one of said pair of transverse sealing means has attached thereto a returning means for pressing said one transverse sealing means in the direction towards the other of said pair of transverse sealing means by a restorative elastic force proportional to the strain of said returning means.

* * * * *